US012559615B2

(12) United States Patent
Park et al.

(10) Patent No.: US 12,559,615 B2
(45) Date of Patent: Feb. 24, 2026

(54) ARTIFICIAL MARBLE COMPOSITION AND ARTIFICIAL MARBLE USING SAME

(71) Applicant: LOTTE CHEMICAL CORPORATION, Seoul (KR)

(72) Inventors: Jong Chul Park, Uiwang-si (KR); Wooyoung Choi, Uiwang-si (KR); Doo Kyo Jeong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 711 days.

(21) Appl. No.: 17/634,030

(22) PCT Filed: Jul. 1, 2020

(86) PCT No.: PCT/KR2020/008595
§ 371 (c)(1),
(2) Date: Feb. 9, 2022

(87) PCT Pub. No.: WO2021/040218
PCT Pub. Date: Mar. 4, 2021

(65) Prior Publication Data
US 2022/0289961 A1 Sep. 15, 2022

(30) Foreign Application Priority Data

Aug. 27, 2019 (KR) ........................ 10-2019-0105311

(51) Int. Cl.
| | |
|---|---|
| *C08L 33/08* | (2006.01) |
| *C08K 3/22* | (2006.01) |
| *C08K 3/26* | (2006.01) |
| *C08K 3/32* | (2006.01) |

(52) U.S. Cl.
CPC .............. *C08L 33/08* (2013.01); *C08K 3/22* (2013.01); *C08K 3/26* (2013.01); *C08K 3/32* (2013.01); *C08K 2003/2227* (2013.01); *C08K 2003/267* (2013.01); *C08K 2003/323* (2013.01)

(58) Field of Classification Search
CPC ............. C04B 14/303; C04B 2103/63; C04B 2111/545; C04B 26/06; C04B 24/003; C08L 33/12; C08K 3/26; C08K 2003/267; C08K 2003/323; C08K 3/32; C08K 5/5205
See application file for complete search history.

(56) References Cited

U.S. PATENT DOCUMENTS

| | | | |
|---|---|---|---|
| 10,370,535 B2 | 8/2019 | Lee | |
| 2014/0162059 A1* | 6/2014 | Wan ........................ | C09J 133/00 |
| | | | 428/355 AC |
| 2017/0349746 A1* | 12/2017 | Lee ........................ | C09K 21/02 |

FOREIGN PATENT DOCUMENTS

| | | |
|---|---|---|
| CN | 105949598 A | 9/2016 |
| CN | 106009042 A | 10/2016 |
| CN | 106220890 A | 12/2016 |
| JP | 2005-179445 A | 7/2005 |
| JP | 2015-121042 A | 7/2015 |
| KR | 10-0697958 B1 | 3/2007 |
| KR | 10-2007-0048041 A | 5/2007 |
| KR | 10-2013-0077468 A | 7/2013 |
| KR | 10-2015-0007430 A | 1/2015 |
| KR | 10-2015-0030401 A | 3/2015 |
| KR | 10-1660767 B1 | 9/2016 |
| KR | 10-1689872 B1 | 12/2016 |
| KR | 10-2017-0137561 A | 12/2017 |
| KR | 10-1952148 B1 | 2/2019 |
| KR | 10-2019-0048455 A | 5/2019 |
| WO | 2021/040218 A1 | 3/2021 |

OTHER PUBLICATIONS

International Search Report in counterpart International Application No. PCT/KR2020/008595 dated Nov. 13, 2020, pp. 1-5.
Extended Search Report in counterpart European Application No. 20858336.9 dated Oct. 23, 2023, pp. 1-9.
Hollingbery, L.A., et al., "The fire retardant effects of huntite in natural mixtures with hydromagnesite," Polymer Degradation and Stability 97 (2012), pp. 504-512.
Laoutid, F., et al., "New prospects in flame retardant polymer materials: From fundamentals to nanocomposites," Materials Science and Engineering R 63 (2009), pp. 100-125.

* cited by examiner

*Primary Examiner* — Mark S Kaucher
(74) *Attorney, Agent, or Firm* — Additon, Pendleton & Witherspoon, P.A.

(57) ABSTRACT

The present invention provides an artificial marble composition and an artificial marble using the same, the composition including (A) 100 parts by weight of an acrylic resin syrup, (B) 150 parts by weight to 250 parts by weight of an aluminum-based inorganic filler, (C) 8 parts by weight to 100 parts by weight of a phosphorus-based flame retardant, and (D) 35 parts by weight to 100 parts by weight of a magnesium-based flame retardant.

7 Claims, No Drawings

ARTIFICIAL MARBLE COMPOSITION AND ARTIFICIAL MARBLE USING SAME

CROSS-REFERENCE TO RELATED APPLICATIONS

This application claims priority to and the benefit of International Application No. PCT/KR2020/008595, filed Jul. 1, 2020, which published as WO 2021/040218 on Mar. 4, 2021, and Korean Patent Application No. 10-2019-0105311, filed in the Korean Intellectual Property Office on Aug. 27, 2019, the entire disclosure of each of which is incorporated herein by reference.

TECHNICAL FIELD

The present invention relates to an artificial marble composition and artificial marble using the same.

BACKGROUND ART

Artificial marble has been widely used as an interior material in recent years, and is largely divided into two types as an acrylic artificial marble and an unsaturated polyester-based artificial marble depending on a base resin. Of these two types, the acrylic artificial marble is used for various purposes due to soft transparency, luxurious texture, excellent weather resistance, and the like, and thus a demand for it is continuously increasing.

For example, the use of the acrylic artificial marble is expanding as materials for various countertops such as a sink top, a vanity top, reception desks in banks, general stores, etc., interior walls, various interior sculptures, and the like.

As the artificial marble is used in a variety of ways, artificial marble with various patterns and functions is being developed, and also, various methods for improving properties of the artificial marble to suit the various uses are being discussed.

As an example of the artificial marble, artificial marble made of an acrylic resin has a beautiful appearance, excellent workability, and the like, and is lighter and easier to process than natural marble but has somewhat inferior flame retardancy. Accordingly, a method of reinforcing the flame retardancy by including an inorganic filler in the artificial marble made of an acrylic resin has been suggested.

However, recently, in order to secure stability against fires in buildings, ships, appliances, and the like to which the artificial marble is applied, depending on a field and a location where the artificial marble is used, artificial marble capable of preventing continuous flame spread as well as meeting very high flame retardancy, compared with the conventional one, is required.

DISCLOSURE

Description of the Drawings

Technical Problem

An embodiment provides an artificial marble composition having excellent flame retardancy and flame spread-preventing characteristics, and artificial marble using the same.

Technical Solution

According to an embodiment, an artificial marble composition includes (A) 100 parts by weight of an acrylic resin syrup, (B) 150 parts by weight to 250 parts by weight of an aluminum-based inorganic filler, (C) 8 parts by weight to 100 parts by weight of a phosphorus-based flame retardant, and (D) 35 parts by weight to 100 parts by weight of a magnesium-based flame retardant.

Based on (A) 100 parts by weight of the acrylic resin syrup, a sum of the (B) aluminum-based inorganic filler, the (C) phosphorus-based flame retardant, and the (D) magnesium-based flame retardant may be less than or equal to 300 parts by weight.

The (C) phosphorus-based flame retardant may include triphenyl phosphate (TPP), ammonium polyphosphate, melamine/ammonium polyphosphate, melamine phosphate, melamine polyphosphate, melamine pyrophosphate, resorcinol-di(bis-2,6-dimethylphenyl) phosphate (RDP), bisphenol A diphenyl phosphate (BDP), cyclophosphazene, aluminum diethylphosphinate, a diethylphosphinate ammonium salt, or a combination thereof.

The (C) phosphorus-based flame retardant may include melamine/ammonium polyphosphate.

The (D) magnesium-based flame retardant may include magnesium carbonate, magnesium calcium carbonate, or a combination thereof.

The (D) magnesium-based flame retardant may include a mixture of hydromagnesite and huntite.

The (A) acrylic resin syrup may include an acrylic monomer and a polymer of the acrylic monomer.

Based on 100 wt % of the (A) acrylic resin syrup, the polymer of the acrylic monomer may be included in an amount of 10 wt % to 30 wt %.

An average particle diameter of the (B) aluminum-based inorganic filler may be 10 μm to 4 mm.

The (B) aluminum-based inorganic filler may include aluminum oxide, aluminum hydroxide, or a combination thereof.

The artificial marble composition may further include at least one additive selected from an initiator, a crosslinking agent, a coupling agent, a surfactant, a curing accelerator, an antistatic agent, an antibacterial agent, an antifoaming agent, a dispersing agent, a molecular weight controlling agent, an ultraviolet absorber, a colorant, a dye, and a pigment.

On the other hand, according to another embodiment, an artificial marble using the aforementioned artificial marble composition is provided.

Advantageous Effects

An artificial marble composition according to an embodiment exhibits improved flame retardancy and flame spread-preventing characteristics, compared with a conventional artificial marble composition, and may provide artificial marble having very high flame retardancy, for example, excellent stability against fire, even though applied as interior/exterior materials such as walls of buildings, ships, appliances, and the like, tops, and the like.

MODE FOR INVENTION

Hereinafter, embodiments of the present invention will be described in detail. However, these embodiments are merely examples, the present invention is not limited thereto, and the present invention is defined by the scope of claims.

Unless otherwise defined, all terms (including technical and scientific terms) used herein have the same meaning as commonly understood by one of ordinary skill in the art. In the present specification, unless explicitly described to the contrary, the word "comprise" and variations such as "comprises" or "comprising" will be understood to imply the inclusion of stated elements but not the exclusion of any other elements. Unless otherwise specified in this specification, a singular form also includes a plural form.

Unless otherwise specified in this specification, the average particle diameter is the volume average diameter, and means the Z-average particle diameter measured using a dynamic light scattering analyzer.

An artificial marble composition according to an embodiment includes (A) 100 parts by weight of an acrylic resin syrup, (B) 150 parts by weight to 250 parts by weight of an aluminum-based inorganic filler, (C) 8 parts by weight to 100 parts by weight of a phosphorus-based flame retardant, and 35 parts by weight to 100 parts by weight of a magnesium-based flame retardant.

Hereinafter, each component constituting a reinforced artificial marble of the present invention is described in detail.

(A) Acrylic Resin Syrup

In an embodiment, the acrylic resin syrup is a basic component of the artificial marble composition, and provides basic physical properties to the artificial marble composition due to the acrylic resin syrup.

In an embodiment, the acrylic resin syrup may include an acrylic monomer and a polymer of the acrylic monomer. That is, the acrylic resin syrup may include an acrylic monomer and a polyacrylate that is a polymer thereof which are dissolved therein.

The acrylic monomer may include methyl (meth)acrylate, ethyl(meth)acrylate, isopropyl (meth)acrylate, n-butyl (meth)acrylate, 2-ethyl hexyl (meth)acrylate, and the like.

Based on 100 wt % of the acrylic resin syrup, the polymer of the acrylic monomer may be included in an amount of greater than or equal to 10 wt %, for example greater than or equal to 11 wt %, for example greater than or equal to 12 wt %, for example greater than or equal to 13 wt %, for example greater than or equal to 14 wt %, and for example less than or equal to 30 wt %, for example less than or equal to 25 wt %, for example less than or equal to 20 wt %, for example 10 wt % to 30 wt %, for example 10 wt % to 20 wt %, for example 12 wt % to 20 wt %, for example, 14 wt % to 18 wt %, and for example about 16 wt %.

If the acrylic monomer polymer in the acrylic resin syrup is included in an amount of less than 10 wt %, severe shrinkage after curing in the artificial marble manufacturing process may be generated to cause appearance defects, and if it exceeds 30 wt %, the viscosity will increase to deteriorate moldability and mechanical properties.

(B) Aluminum-based Inorganic Filler

In an embodiment, an aluminum-based inorganic filler performs functions of imparting mechanical properties and natural stone textures to the artificial marble composition, and simultaneously reinforcing the low flame retardancy due to the acrylic resin.

In an embodiment, aluminum oxide, aluminum hydroxide, or a combination thereof may be used as the aluminum-based inorganic filler. Specifically, aluminum hydroxide may be used as the aluminum-based inorganic filler.

In an embodiment, an average particle diameter of the aluminum-based inorganic filler may be, for example, 10 μm to 4 mm. When the average particle diameter of the aluminum-based inorganic filler is within the above range, the artificial marble may exhibit excellent appearance and sanding properties.

In an embodiment, the aluminum-based inorganic filler may be used by mixing two or more types having different average particle diameters. For example, the aluminum-based inorganic filler may include a first aluminum-based inorganic filler having an average particle diameter of 50 μm to 120 μm, for example, 50 μm to 100 μm, or for example 60 μm to 100 μm, and a second aluminum-based inorganic filler having an average particle diameter of 5 μm to 40 μm, for example, 10 μm to 40 μm, or for example, 10 μm to 30 μm.

Herein, a weight ratio of the first aluminum-based inorganic filler and the second aluminum-based inorganic filler in the aluminum-based inorganic filler may be, for example, 1:1 to 5:1, for example 1:1 to 4:1, and for example, 1:1 to 3:1.

When the average particle diameter and/or weight ratio of the first and second aluminum-based inorganic fillers in the aluminum-based inorganic filler satisfy the above-described ranges, stable flame retardancy may be secured.

On the other hand, based on 100 parts by weight of the acrylic resin syrup, the aluminum-based inorganic filler may be included, for example, in an amount of greater than or equal to 150 parts by weight, greater than or equal to 200 parts by weight, and for example, less than or equal to 250 parts by weight, for example 240 parts by weight, for example, less than or equal to 230 parts by weight, for example less than or equal to 225 parts by weight, for example, 150 parts by weight to 250 parts by weight, for example 150 parts by weight to 240 parts by weight, for example 150 parts by weight to 230 parts by weight, or for example, 150 parts by weight to 225 parts by weight.

When the amount of the aluminum-based inorganic filler is less than 150 parts by weight in the artificial marble composition, the effect of reinforcing the low flame retardancy of the acrylic resin is insufficient or a total heat dissipation amount is greatly increased, which may make it difficult to prevent flame spread, and when it exceeds 250 parts by weight, as a specific gravity of the slurry increases, moldability and workability may be greatly reduced.

(C) Phosphorus-Based Flame Retardant

In an embodiment, a phosphorus-based flame retardant reinforces basic flame retardancy of the artificial marble composition, securing very high flame retardancy. In addition, in an embodiment, when the phosphorus-based flame retardant is included with a magnesium-based flame retardant to be described later in a predetermined ratio, excellent flame retardancy and flame spread-preventing characteristics may be accomplished.

In an embodiment, the phosphorus-based flame retardant may include a conventional phosphorus-based flame retardant in order to reinforce the flame retardancy of the artificial marble composition. For example, the phosphorus-based flame retardant may include a phosphate compound, a phosphonate compound, a phosphinate compound, a phosphine oxide compound, a phosphazene compound, a metal salt thereof, and the like. The phosphorus-based flame retardants may be used alone or as a mixture of two or more.

For specific example, the phosphorus-based flame retardant may include triphenyl phosphate (TPP), ammonium polyphosphate, melamine/ammonium polyphosphate, melamine phosphate, melamine polyphosphate, melamine pyrophosphate, resorcinol-di(bis-2,6-dimethylphenyl) phosphate (RDP), bisphenol A diphenyl phosphate (BDP), cyclophosphazene, aluminum diethylphosphinate, a diethylphosphinate ammonium salt, or a combination thereof.

More specifically, the phosphorus-based flame retardant according to an embodiment may include at least one of ammonium polyphosphate, melamine/ammonium polyphosphate, melamine phosphate, and melamine polyphosphate.

For example, the flame retardant according to an embodiment may include melamine/ammonium polyphosphate. The melamine/ammonium polyphosphate may include a melamine-derived structural unit and an ammonium-derived structural unit, respectively.

On the other hand, based on 100 parts by weight of the acrylic resin syrup, the phosphorus-based flame retardant may be included in an amount of greater than or equal to 8 parts by weight, or for example greater than or equal to 9 parts by weight, and for example less than or equal to 100 parts by weight, for example less than or equal to 90 parts by weight, for example less than or equal to 80 parts by weight, for example less than or equal to 70 parts by weight, for example less than or equal to 60 parts by weight, for example less than or equal to 50 parts by weight, for example less than or equal to 40 parts by weight, for example less than or equal to 30 parts by weight, or for example 8 parts by weight to 100 parts by weight, for example 8 parts by weight to 80 parts by weight, for example 8 parts by weight to 70 parts by weight, for example 8 parts by weight to 60 parts by weight, for example 8 parts by weight to 50 parts by weight, for example 8 parts by weight to 40 parts by weight, or for example 8 parts by weight to 30 parts by weight.

When the content of the phosphorus-based flame retardant is less than 8 parts by weight, flame retardancy may be decreased, and when it exceeds 100 parts by weight, moldability and mechanical properties may be deteriorated.

(D) Magnesium-Based Flame Retardant

In an embodiment, the magnesium-based flame retardant with the phosphorus-based flame retardant may enhance the flame retardancy of the artificial marble composition and further perform a function of improving the flame spread-preventing characteristics by significantly lowering a heat dissipation amount of the artificial marble composition.

In an embodiment, the (D) magnesium-based flame retardant may include magnesium carbonate, magnesium calcium carbonate, or a combination thereof. In an embodiment, the magnesium-based flame retardant may include a mixture of magnesium carbonate and magnesium calcium carbonate.

Specifically, the magnesium carbonate may be represented by Chemical Formula 1.

$$Mg_a(CO_3)_b(OH)_{2a-2b} \cdot cH_2O \qquad \text{[Chemical Formula 1]}$$

In Chemical Formula 1, a is 1 to 6, b is 0 to 5, and c is 0 to 6. Desirably, the magnesium carbonate represented by Chemical Formula 1 may be hydromagnesite $(Mg_5(CO_3)_4 (OH)_2 \cdot 4H_2O$, wherein a is 5, b is 4, and c is 4).

On the other hand, the magnesium calcium carbonate may be represented by Chemical Formula 2.

$$Mg_xCa_y(CO_3)_{x+y} \cdot m \, H_2O \qquad \text{[Chemical Formula 2]}$$

In Chemical Formula 2, x and y are each independently 1 to 5, and m is 0 to 5. Desirably, the magnesium calcium carbonate represented by Chemical Formula 2 may be huntite $(Mg_3Ca(CO_3)_4$ wherein x is 3, y is 1, and m is 0).

More specifically, the magnesium-based flame retardant may include a mixture of hydromagnesite and huntite.

In an embodiment, the flame retardant may include magnesium carbonate represented by Chemical Formula 1 and magnesium calcium carbonate represented by Chemical Formula 2 in a weight ratio of 3:1 to 2:1, but is not necessarily limited thereto.

A conventional artificial marble composition in general includes the phosphorus-based flame retardant along with the aluminum-based inorganic filler in order to reinforce the flame retardancy. However, in order for the artificial marble composition to exhibit excellent flame retardancy, the aluminum-based inorganic filler and/or the phosphorus-based flame retardant should be decomposed at a lower temperature than a decomposition temperature of a polymer (e.g., polymethyl methacrylate) of acrylic monomers, but may rather be decomposed at a much higher temperature than the decomposition temperature of the polymer of acrylic monomers at the initial flame spread. Herein, since the polymer of acrylic monomers is first decomposed at the initial flame spread and greatly increases an initial heat dissipation amount, even though the aluminum-based inorganic filler and/or the phosphorus-based flame retardant are decomposed, a total heat dissipation amount may be greatly increased over the entire combustion process. Accordingly, the flame retardancy of the artificial marble composition may not be significantly reinforced only by using the phosphorus-based flame retardant with the aluminum-based inorganic filler.

On the other hand, since the artificial marble composition according to an embodiment includes (D) the magnesium-based flame retardant along with (C) the phosphorus-based flame retardant at the initial flame spread, (B) the aluminum-based inorganic filler and/or (D) the magnesium-based flame retardant may be decomposed at a lower temperature than the decomposition temperature of the polymer of acrylic monomers. Herein, the artificial marble composition according to an embodiment may reduce the initial heat dissipation amount through decomposition products such as $H_2O$ and the like, which are released by the decomposition of (B) the aluminum-based inorganic filler and/or (D) the magnesium-based flame retardant, and suppress flame spread, and in addition, decrease the total heat dissipation amount over the entire combustion process and thus exhibit excellent flame retardancy, particularly an excellent flame spread-preventing characteristics.

On the other hand, based on 100 parts by weight of the acrylic resin syrup, the magnesium-based flame retardant may be included in an amount of greater than or equal to 35 parts by weight, for example greater than or equal to 36 parts by weight, for example greater than or equal to 37 parts by weight, or for example greater than or equal to 38 parts by weight, and for example less than or equal to 100 parts by weight, for example less than or equal to 90 parts by weight, for example less than or equal to 80 parts by weight, for example less than or equal to 70 parts by weight, for example less than or equal to 60 parts by weight, for example less than or equal to 50 parts by weight, for example less than or equal to 40 parts by weight, or for example less than or equal to 30 parts by weight, for example 35 parts by weight to 100 parts by weight, or for example 35 parts by weight to 80 parts by weight.

When the phosphorus-based flame retardant is included in an amount of less than 35 parts by weight, flame retardancy and flame spread-preventing characteristics may be greatly deteriorated, and when the phosphorus-based flame retardant is included in an amount of greater than 100 parts by weight, moldability and workability may be deteriorated, and in addition, an amount of the magnesium-based flame retardant relative to that of the aluminum-based inorganic filler may be excessively larger thus making it difficult to improve the flame spread-preventing characteristic.

On the other hand, the artificial marble composition according to an embodiment may control a total content of the components that impart flame retardancy and/or flame spread-preventing characteristics to the acrylic resin syrup to a predetermined content or less. For example, based on (A) 100 parts by weight of the acrylic resin syrup, the total amount of (B) the aluminum-based inorganic filler, (C) the phosphorus-based flame retardant, and (D) the magnesium-based flame retardant may be controlled to be 300 parts by weight, for example, less than or equal to 290 parts by weight, or for example, less than or equal to 280 parts by weight.

When the total amount of (B) the aluminum-based inorganic filler, (C) the phosphorus-based flame retardant, and (D) the magnesium-based flame retardant based on 100 parts by weight of (A) the acrylic resin syrup is greater than 300 parts by weight, moldability and workability may be greatly deteriorated.

(E) Other Additives

The artificial marble composition according to an embodiment may further include at least one additive required according to final uses of the artificial marble composition in addition to the (A) to (D) components in order to balance each physical property under the condition of securing high flame retardancy and flame spread-preventing characteristics.

Specifically, the additive may be an initiator, a crosslinking agent, a coupling agent, a surfactant, a curing accelerator, an antistatic agent, an antibacterial agent, an antifoaming agent, a dispersing agent, a molecular weight controlling agent, an ultraviolet absorber, a colorant, a dye, a pigment, and the like, and may be used alone or in a combination of two or more.

These additives may be appropriately included within a range that does not impair the physical properties of the artificial marble composition, and specifically, may be included in an amount of less than or equal to 20 parts by weight based on 100 parts by weight of the (A) acrylic resin syrup, but is not limited thereto.

Artificial marble according to an embodiment may be manufactured by mixing the above components to prepare an artificial marble slurry and then spraying the artificial marble slurry into a forming cell and curing it in a conventional method.

On the other hand, the artificial marble according to an embodiment may be further subjected to a sanding treatment after the curing. In an embodiment, the sanding treatment may be performed by sanding the cured artificial marble with sandpaper with a particle size of #300 to #400. The sanded artificial marble may exhibit a smooth and beautiful appearance.

The artificial marble may exhibit excellent flame retardancy and flame spread-preventing characteristics by using the aluminum-based inorganic filler and a mixture of two different types of flame retardants (the phosphorus-based flame retardant and the magnesium-based flame retardant). For example, a total heat dissipation amount of the artificial marble may be less than or equal to 3 MJ, for example, less than or equal to 2.9 MJ, for example, less than or equal to 2.8 MJ, for example, less than or equal to 2.7 MJ, for example, less than or equal to 2.6 MJ, or for example, less than or equal to 2.5 MJ. Accordingly, the artificial marble may exhibit high flame retardancy and thus excellent stability against fire, even though applied as, for example, interior/exterior materials for walls, tops, etc. of buildings, ships, and appliances.

Hereinafter, the present invention is illustrated in more detail with reference to examples and comparative examples. However, the following examples and comparative examples are provided for the purpose of descriptions and the present invention is not limited thereto.

Each component used in the following examples and comparative examples is as follows.

(A) Acrylic Resin Syrup

Methylmethacrylate (MMA) made by Lotte Chemical Corp. and polymethyl methacrylate (PMMA) made by Arkema Inc. were respectively used. In the syrup, the polymethyl methacrylate (PMMA) was included in an amount of about 16 wt %, and the methyl methacrylate (MMA) was included in an amount of about 84 wt %.

(B) Aluminum-Based Inorganic Filler

Two types of aluminum hydroxide (X27 and X277 made by Chalco) (Model Name: X27, average particle diameter: 80 μm, Model Name: X277, average particle diameter: 20 μm) were mixed in a weight ratio of X27:X227=2:1.

(C) Phosphorus-Based Flame Retardant

Melamine/ammonium polyphosphate including a melamine-derived structural unit and an ammonium-derived structure unit (Model Name: BRP-727, Chem Route) was used.

(D) Magnesium-Based Flame Retardant

A mixture of hydromagnesite and huntite made by LKAB Minerals Co., Ltd. (Model Name: Ultracarb 1251) was used.

(E-1) Pigment

WH101 made by Cristal USA Inc. (Model Name: TIONA RCL 188) was used.

(E-2) Initiator

An initiator KPQ made by Dongsung Highchem Co., Ltd. (Model Name: Chemex-MOM) was used.

Examples 1 to 3 and Comparative Examples 1 to 5

(A) 100 parts by weight of an acrylic resin syrup was mixed with (E-1) 0.84 parts by weight of a pigment in a mixer, and (B) 200 parts by weight of an aluminum-based inorganic filler was further added thereto, preparing a slurry for forming artificial marble.

Subsequently, (C) a phosphorus-based flame retardant and (D) a magnesium-based flame retardant were added to the artificial marble slurry in each content shown in Table 1 and then mixed with a mixer. The artificial marble slurry mixed with the flame retardants was vacuum-treated and foam-removed at 740 mmHg for 3 minutes, and (E-2) 2.0 parts by weight of an initiator was added thereto and then stirred for 1 minute. Then, the artificial marble slurry mixed with the initiator was poured and cast onto a plate-shaped mold on which a PV-OH film was placed (pouring casting).

Subsequently, the mold for molding the artificial marble slurry was put in an oven and cured at 80° C. for 1 hour, and then the surface of the cured artificial marble was sequentially sanded with sandpaper with a particle size of #360 and #400. The sanded artificial marble was cut to have a width X a length X a thickness (800 mm×150 mm×12 mm), completing artificial marble specimens according to examples and comparative examples.

In Table 1, the components (A), (B), (C), (D), (E-1), and (E-2) are all expressed in parts by weight.

TABLE 1

| Component | | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|
| (A) | | 100 | 100 | 100 | 100 | 100 | 100 | 100 | 100 |
| (B) | | 200 | 220 | 150 | 240 | 180 | 130 | 200 | 200 |
| (C) | | 10 | 20 | 10 | 0 | 0 | 0 | 10 | 5 |
| (D) | | 40 | 40 | 80 | 0 | 40 | 90 | 30 | 40 |
| (E) | (E-1) | 0.84 | 0.84 | 0.84 | 0.84 | 0.84 | 0.84 | 0.84 | 0.84 |
| | (E-2) | 2.0 | 2.0 | 2.0 | 2.0 | 2.0 | 2.0 | 2.0 | 2.0 |

Each specimen was evaluated with respect to flame retardancy. Specifically, each artificial marble specimen was measured according to IMO Resolution MSC.307 (88, 2010 FTP Code Annex 1, Part 5) with respect to time to ignite, while the surface of the specimen was vertically exposed to a flame of about 1000° C. for 40 minutes (hereinafter, ignition time, unit: seconds), a highest heat dissipation rate (unit: kW), time to reach the highest heat dissipation rate (hereinafter, time required for the highest heat dissipation rate, unit: seconds), and a total amount of heat released by each specimen during the evaluation process (hereinafter, a total heat dissipation amount, unit: MJ), and the results are shown in Table 2.

TABLE 2

| | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| Ignition time (s) | 146 | 125 | 195 | 94 | 195 | 125 | 108 | 89 |
| Highest heat dissipation rate (kW) | 1.78 | 3.32 | 3.27 | 5.30 | 3.27 | 5.1 | 3.39 | 4.07 |
| Time required for highest heat dissipation rate (s) | 264 | 387 | 309 | 806 | 400 | 387 | 400 | 431 |
| Total heat dissipation amount (MJ) | 1.02 | 2.25 | 2.19 | 7.43 | 3.48 | 6.32 | 3.50 | 6.35 |

Referring to Table 2, the artificial marble compositions including an acrylic resin syrup, the aluminum-based inorganic filler, and two different flame retardants (the phosphorus-based flame retardant and the aluminum flame retardant) within each range above exhibited excellent flame retardancy and flame spread-preventing characteristics due to lower total heat dissipation amounts than those of the comparative examples.

Although the present invention has been described through preferred embodiments as described above, the present invention is not limited thereto, and various modifications and variations are possible without departing from the concept and scope of the following claims, which will be readily understood by a person skilled in the art to which the present invention pertains.

The invention claimed is:

1. An artificial marble composition, comprising
(A) 100 parts by weight of an acrylic resin syrup,
(B) 150 parts by weight to 250 parts by weight of an aluminum-based inorganic filler,
(C) 8 parts by weight to 100 parts by weight of a phosphorus-based flame retardant, and
(D) 35 parts by weight to 100 parts by weight of a magnesium-based flame retardant, wherein the (C) phosphorus-based flame retardant comprises melamine/ammonium polyphosphate, the (D) magnesium-based flame retardant comprises a mixture of hydromagnesite and huntite, and based on (A) 100 parts by weight of the acrylic resin syrup, a sum of the (B) aluminum-based inorganic filler, the (C) phosphorus-based flame retardant, and the (D) magnesium-based flame retardant is less than or equal to 300 parts by weight, wherein the (B) aluminum-based inorganic filler comprises a mixture of a first aluminum-based inorganic filler having an average particle diameter of 50 μm to 120 μm and a second aluminum-based inorganic filler having an average particle diameter of 5 μm to 40 μm.

2. The artificial marble composition of claim 1, wherein the (A) acrylic resin syrup comprises an acrylic monomer and a polymer of the acrylic monomer.

3. The artificial marble composition of claim 2, wherein based on 100 wt % of the (A) acrylic resin syrup, the polymer of the acrylic monomer is included in an amount of 10 wt % to 30 wt %.

4. The artificial marble composition of claim 1, wherein an average particle diameter of the (B) aluminum-based inorganic filler is 10 μm to 4 mm.

5. The artificial marble composition of claim 1, wherein the (B) aluminum-based inorganic filler comprises aluminum oxide, aluminum hydroxide, or a combination thereof.

6. The artificial marble composition of claim 1, which further comprises at least one additive selected from an initiator, a crosslinking agent, a coupling agent, a surfactant, a curing accelerator, an antistatic agent, an antibacterial agent, an antifoaming agent, a dispersing agent, a molecular weight controlling agent, an ultraviolet absorber, a colorant, a dye, and a pigment.

7. An artificial marble using the artificial marble composition of claim 1.

* * * * *